United States Patent [19]

Kawasaki et al.

[11] 4,317,766

[45] Mar. 2, 1982

[54] FLAME-RETARDANT POLYAMIDE RESIN COMPOSITION WITH MELAMINE CYANURATE UNIFORMLY DISPERSED THEREIN

[75] Inventors: Hironobu Kawasaki; Kouichirou Yoshida; Tomoo Itoh, all of Nobeoka, Japan

[73] Assignee: Asahi Kasei Kogyo Kabushiki Kaisha, Osaka, Japan

[21] Appl. No.: 75,596

[22] Filed: Sep. 14, 1979

[30] Foreign Application Priority Data

Sep. 18, 1978 [JP] Japan ................................ 53/114355

[51] Int. Cl.³ ................................................ C08K 5/34
[52] U.S. Cl. .................................... 524/101; 528/314; 528/336; 524/720
[58] Field of Search ................ 260/45.8 NT; 528/314, 528/336

[56] References Cited

U.S. PATENT DOCUMENTS 3,660,344 5/1972 Michael et al. ............. 260/45.8 NT
4,001,177 1/1977 Tsutsumi et al. ........... 260/45.8 NT
4,180,496 12/1979 Yanagimoto et al. ...... 260/45.8 NT

*Primary Examiner*—Harold D. Anderson
*Attorney, Agent, or Firm*—Armstrong, Nikaido, Marmelstein & Kubovcik

[57] ABSTRACT

A flame-retardant polyamide composition comprising 98 to 60% by weight of a polyamide and, uniformly dispersed therein, 2 to 40% by weight of melamine cyanurate, characterized in that nearly 100% of the latter particles have a particle size of at most 35μ and at least 80% by weight of the particles have a particle size of at most 10μ; and a process for producing said composition.

8 Claims, 12 Drawing Figures

10μ

100μ

100μ

ANGLE OF DIFFRACTION (DEGREE)

ANGLE OF DIFFRACTION (DEGREE)

ANGLE OF DIFFRACTION (DEGREE)

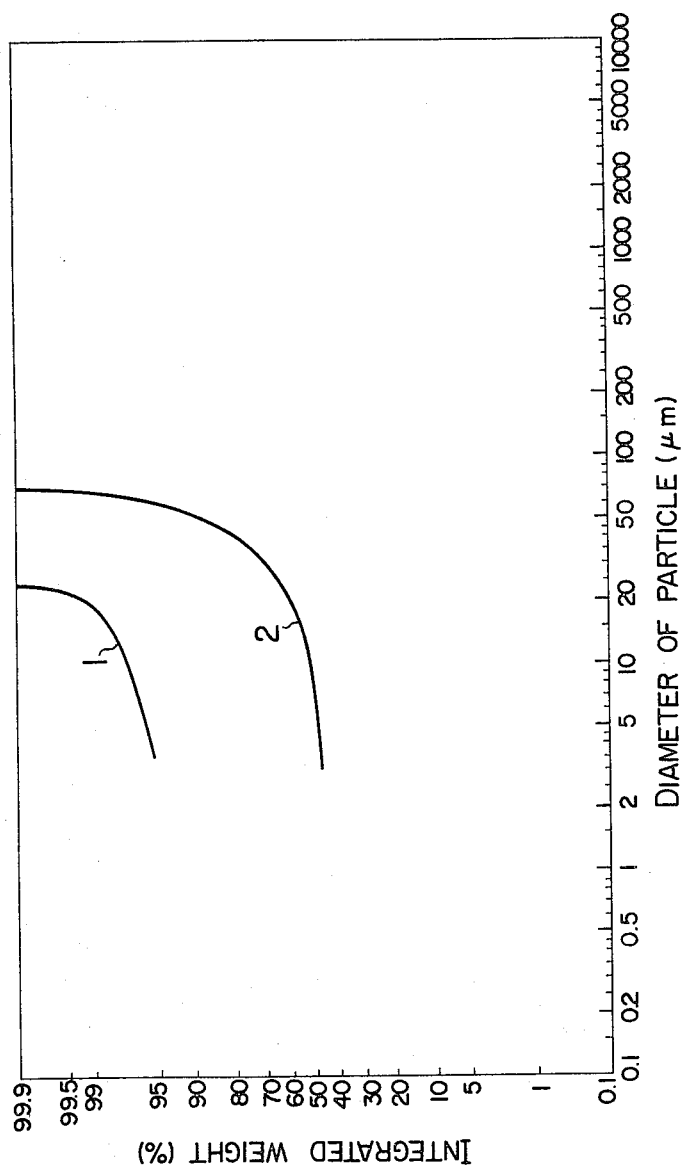

FLAME-RETARDANT POLYAMIDE RESIN COMPOSITION WITH MELAMINE CYANURATE UNIFORMLY DISPERSED THEREIN

This invention relates to a flame-retardant polyamide composition comprising a polyamide and melamine cyanurate, the latter being uniformly and finely dispersed in the former, and also to a process for producing said composition.

The composition of this invention is excellent not only in flame retardancy but also in mechanical properties and processability; when colored it gives molded articles of bright color; it is melt-spinnable; and it can be drawn, forming a drawn fiber having excellent flame retardancy and excellent mechanical properties.

Melamine has been proposed as a flame retardant for polyamides (U.S. Pat. No. 3,660,344). However, melamine in the melamine-polyamide composition sublimes during molding and fouls the mold by depositing on the surface, giving rise to a so-called plate out phenomenon. Further, with the lapse of time, melamine or its decomposition products migrate from inside the molded article to the surface and exude in powder form, to exhibit a phenomenon called "blooming".

A cyanuric acid-polyamide composition has also been proposed (U.S. Pat. No. 3,980,616). This composition tends to yield an injection-molded article containing bubbles, which has inferior mechanical properties, and has the disadvantage of marked blooming.

There has been proposed also a polyamide composition containing melamine and cyanuric acid, the amount of the latter being less than that of melamine (U.S. Pat. No. 4,001,177). This composition has a disadvantage when used in molding, similar to that of the above-noted melamine-polyamide composition. Although described as fiber-forming, this composition, as mentioned later, failed to give usable fiber.

In order to overcome the above disadvantages, it has been proposed to use melamine cyanurate, which is an equimolar reaction product of melamine and cyanuric acid, as flame retardant in polyamide resin compositions (Japanese Patent Application Laid-open, 31,759/78). However, the molded articles from these melamine cyanurate-containing polyamide compositions is so turbid that a colored molded article with sufficient brightness cannot be obtained by the incorporation of a pigment. For instance, when incorporated with a black pigment in an amount sufficient for an ordinary polyamide, there is obtained a molded article grey in color. If it is intended to obtain sufficiently black color, it is necessary to use a black pigment in an amount several times the usual quantity, resulting in the reduction in flame retardancy and mechanical properties of the molded article. In other words, it is impossible to obtain a colored molded article having commercial value from a conventional melamine cyanurate-containing composition.

It is also difficult to obtain a flame retardant yarn from the above compositions, because when the compositions are melt spun and drawn, frequent yarn breakages make it impossible to produce continuously and steadily a yarn having a filament diameter of 10 to 100$\mu$ which is a common diameter range in usual polyamide fibers.

When the said compositions are shaped into a film material by the blown film extrusion or flat film extrusion methods, white particles of a size perceptible to the unaided eye appear on the film surface to not only produce a film of unacceptable appearance but also to rupture the film.

The aforementioned disadvantages of the conventional melamine cyanurate-containing polyamide composition are due to inferior dispersion of melamine cyanurate in polyamide and the existence of large particles of melamine cyanurate in the composition. There has been no commercial method capable of eliminating the disadvantages due to the existence of such large particles. It is indeed possible to grind melamine cyanurate to a fine powder of a particle size of 2 to 3$\mu$ (see FIG. 1). However, when such melamine cyanurate powder and a polyamide are mixed together by melting in an extruder or the like, fine particles of melamine cyanurate undergo secondary agglomeration and change into larger particles of several tens $\mu$ in particle size (see FIG. 2). Such secondary agglomeration cannot be prevented even if a mixing extruder of high mixing performance is used.

Although an attempt was made to incorporate a bisamide compound as a dispersant into a polyamide-melamine cyanurate composition (Japanese Patent Application Laid-Open, No. 15,955/79), the resulting effect was insufficient for eliminating the above difficulties.

This invention relates to a polyamide composition in which the particle size of melamine cyanurate dispersed in the polyamide is strictly controlled within a range far narrower than that attained in the prior art. More particularly, this invention relates to a flame-retardant polyamide composition comprising 98 to 75% by weight of a polyamide and, dispersed therein, 2 to 25% by weight of melamine cyanurate, characterized in that nearly 100% of the latter particles have a particle size of at most 35$\mu$ and at least 80% by weight a particle size of at most 10$\mu$.

This composition is excellent in flame retardancy and mechanical properties, it shows neither plate out in molding nor blooming on the molded article, and it can be colored brightly. Said composition is melt-spinnable, and it can drawn to yield continuously and steadily a yarn of several tens $\mu$ in filament diameter which is not obtainable from a conventional melamine cyanurate-containing composition.

This invention provides a flame-retardant polyamide composition in which melamine cyanurate is uniformly and finely dispersed.

An object of this invention is to provide a flame-retardant polyamide composition which can be brightly colored.

Another object of this invention is to provide a composition which can be melt spun to form a continuous and uniform flame-retardant yarn.

A further object of this invention is to provide a specific process for producing such a composition easily on a commercial scale.

Brief description of the accompanying drawings is given below.

FIGS. 6(a), (b), (c) and (d) are X-ray diffraction diagrams of a polyamide composition of this invention, melamine, cyanuric acid, and melamine cyanurate, respectively.

Figure 7:
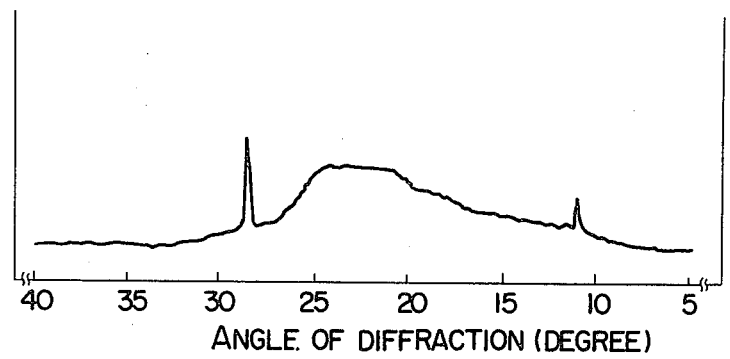

FIG. 7 is an X-ray diffraction diagram of a conventional melamine cyanurate-containing polyamide composition.

Figure 8:
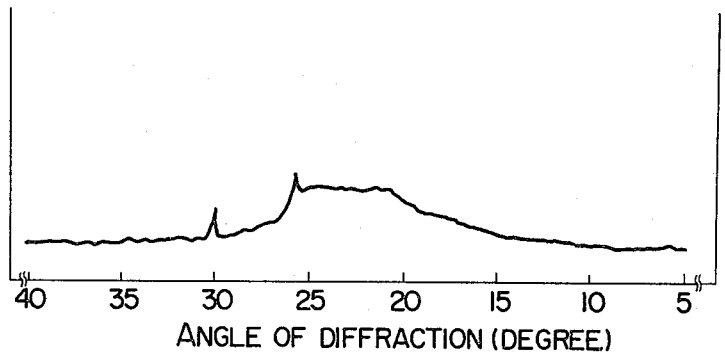

FIG. 8 is an X-ray diffraction diagram of a polyamide composition prepared by melt-mixing a polyamide and an equimolar mixture of melamine and cyanuric acid.

FIG. 9 is particle size distribution diagrams of melamine cyanurate particles dispersed in a melamine cyanurate-containing polyamide composition of this invention (curve 1) and a conventional one (curve 2).

The invention is described below in detail.

The polyamides used in this invention are those well known to the art, including polyamides having recurring carbonamide linkages in the polymer chain, which are obtained by the polymerization of a lactam, polycondensation of an aminocarboxylic acid or a salt formed from a diamine and a dicarboxylic acid, or copolymerization of these monomeric components. Examples of polyamides are nylon 6, nylon 66, nylon 11, nylon 12, nylon 610, nylon 612, and nylon 66/6 copolymer. However, in view of melt forming temperature and flame retardancy, it is preferred to use nylon 6, nylon 66, and nylon 66/6 copolymer, particularly a copolymer containing 95 to 65% by weight of recurring units corresponding to nylon 66 and 5 to 35% by weight of those corresponding to nylon 6. The component ratio of the copolymer, as herein referred to, is expressed in terms of weight percent of the segment derived from hexamethylenediammonium adipate and that of the segment derived from ε-caprolactam in the principal copolymer chain, calculated from the weight percent of each monomer participated in the copolymerization by taking into account the weight of water split off during the copolymerization.

Melamine cyanurate used in this invention is an equimolar reaction product of melamine [structural formula (I)] and cyanuric acid. Cyanuric acid exists in the form of tautomer, as shown by the structural formulas (II). In chemistry, the enol form is usually called cyanuric acid and the keto form isocyanuric acid. The term "cyanuric acid", as herein referred to, include not only the enol form but also the keto form.

The melamine cyanurate-containing polyamide composition of this invention is produced only by the process of this invention, as described later. The upper limit of melamine cyanurate content of the composition is about 40% by weight, said limit being set in view of the production on a large commercial scale. A suitable composition comprises 98 to 75% by weight of a polyamide and 2 to 25% by weight of melamine cyanurate, preferably 97 to 85% by weight of the former and 3 to 15% by weight of the latter. If melamine cyanurate is below 2% by weight, the flame retardancy becomes unsatisfactory, whereas if it exceeds 15% by weight, the melt fluidity in the injection molding becomes inferior and if it exceeds 25% by weight, bright coloring of the molded article with a normal amount of pigment becomes difficult.

In the composition of this invention, it is necessary that nearly 100% of the melamine cyanurate particles dispersed in the polyamide matrix have a particle size of at most 35μ and at least 80% by weight of the particles have a size of at most 10μ, preferably nearly 100% of the particles have a size of at most 30μ and at least 80% by weight of the particles have a size of at most 7μ. Most preferably, nearly 100% of the particles have a size of at most 25μ and at least 95% by weight of the particles have a size of at most 5μ. If the dispersed particles of melamine cyanurate are larger than a range in which nearly 100% of the particles are at most 35μ and at least 80% by weight of the particles are at most 10μ, the composition cannot be brightly colored with a normal amount of pigment. Further, if said dispersed particles are larger than a range in which nearly 100% of the particles have a size of at most 30μ and at least 80% by weight of the particles have a size of at most 7μ, the composition becomes very difficult to be melt spun and draw to a continuous and uniform yarn of 100μ or less in filament diameter. When nearly 100% of the particles have a size of at most 25μ and at least 95% by weight have a size of at most 5μ, a yarn, 50μ or less in filament diameter, is easily produced.

The particle size, as herein referred to, is that of melamine cyanurate particles in the state of dispersion in the melamine cyanurate-containing polyamide composition, as measured by examining a thin section of said composition under an optical microscope with transmitted light. The particle size distribution is determined by statistical treatment of the values obtained by measuring a great number of particles; the size of each particle is measured as follows: Images of particles observed under a microscope are in-putted into a particle analyzer, and the value of the maximum horizontal chord of each particle measured therein is used as the particle size. The particle size distribution on weight basis was determined from the density of the particle and the particle volume calculated from the measured particle size. Since the microscopic examination is made through a thin section of a small but definite thickness, there are cases where it is difficult to discriminate superposed individual particles from a secondary agglomerate. However, if not a secondary agglomerate, the exis-

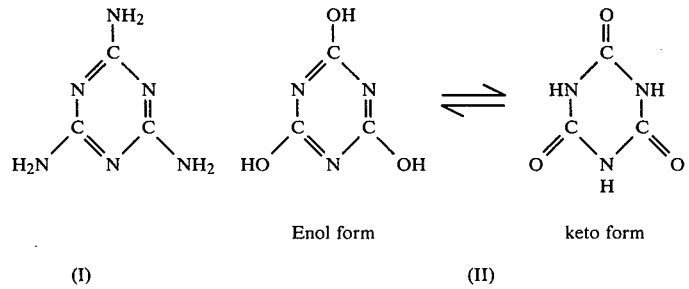

(I)            Enol form            keto form (II)

tence of individual particles so near to one another means localization of particles, that is, poor dispersion. Such a state of dispersion as well as the formation of secondary agglomerate must be avoided to achieve the object of this invention. On the other hand, precise measurement of the size of 2 to 3μ of very small particles is not possible under an optical microscope. For the object of this invention, the most important problems are the existence of large particles and secondary agglomerates. If the amount of relatively large particles such as, for example, those having a diameter of 5μ or more can be measured with sufficient precision, the amount of particles below 5μ can be calculated by subtracting the amount of particles larger than 5μ from the total amount of melamine cyanurate contained in the volume within the field of observation. It is not objectionable to determine the particle size distribution on weight basis from such a measurement. The microscopic field of observation should be as large as possible by taking into consideration the existence of secondary agglomerates or large particles of several tens μ.

Another possible method of measuring particle size is to separate the particles from the composition and to measure directly the particle size. This method cannot be applicable to the present case, because it is probable that during the separation procedure the number of secondary agglomerates may be increased or decreased or the shape of particles may undergo a change; hence, the observed particle size would not be the same as in the dispersion.

The composition of this invention can include heat stabilizers, antistatics, weathering stabilizers, lubricants and other known additives, unless the flame retardancy and the uniform dispersivity of melamine cyanurate are deteriorated.

For electrical use which is one of the principal uses of the present composition, heat resistance is required along with the flame retardancy. For such a requirement, it was found that certain specific heat stabilizers can be advantageously used without interferring with the uniform dispersion of melamine cyanurate.

The heat stabilizers for use in the composition of this invention are selected from the following groups (I, II and III) of compounds and combinations thereof.

I. Copper compounds.
II. Combinations of copper compounds with alkali metal halides.
III. Combinations of copper compounds with alkali metal halides and tin compounds.

Suitable copper compounds for use in the composition are ones which can be uniformly incorporated into polyamide and preferably are organic or inorganic copper salts and copper chelate compounds such as, for example, cuprous chloride, cupric chloride, cuprous iodide, cupric sulfate, cupric nitrate, cupric salicylate, cupric stearate, cupric acetate, cupric benzoate, and cupric sebacate. Of these, cuprous chloride and cupric acetate are preferred.

Alkali metal halides suitable for use are potassium iodide, potassium bromide, potassium chloride, sodium iodide, sodium bromide, and sodium chloride.

Suitable tin compounds include inorganic tin salts such as stannous chloride and stannic chloride; organic tin salts such as stannous oxalate; and hydroxides such as stannous hydroxide and stannic hydroxide. Preferred are inorganic acid salts of divalent tin, particularly stannous chloride.

The amount of a heat stabilizer, based on the polyamide resin, is 0.001 to 0.2, preferably 0.01 to 0.05% by weight of a copper compound and 0.005 to 1.0, preferably 0.05 to 0.5% by weight of an alkali metal halide. The amount of an alkali metal halide is preferably 5 to 15 times the amount of copper compound. A tin compound is used in an amount of 0.001 to 0.5, preferably 0.005 to 0.1% by weight. Although heat stability of the composition is improved by the addition of a copper compound alone, it is further improved by using a copper compound jointly with an alkali metal halide and still further improved by the combination of the above two compounds and a tin compound. When used in an amount below the lower limit given above, any of these heat stabilizers produces insufficient results whereas, when used in an amount exceeding the upper limit, it markedly discolors the polymer, deteriorates mechanical properties or, in some cases, reduces the degree of polymerization of the polyamide.

For the manufacture of flame retardant fiber, which is one of the uses for the composition of this invention, the composition preferably comprises 97 to 85% by weight of a polyamide and 3 to 15% by weight of melamine cyanurate. In this composition, although any of the polyamides commonly used in making fibers can be used, nylon 6, nylon 66 or nylon 66/6 copolymer is particularly preferred. If the melamine cyanurate content is below 3% by weight, the flame retardancy is insufficient, whereas if it exceeds 15% by weight, mechanical properties of the fiber deteriorate so markedly that the fiber becomes unsuitable for practical use.

For the manufacture of the flame retardant fiber of this invention, in which melamine cyanurate is dispersed in a polyamide, it is necessary that nearly 100% of the dispersed particles have a particle size of at most 30μ with at least 80% by weight of the particles having a particle size not exceeding 7μ. If the dispersed particle size is greater than the above range, a yarn of up to 100μ in filament diameter becomes inferior in mechanical properties and unsuitable for practical use. For the yarn of up to 50μ in filament diameter, it is necessary that nearly 100% of the melamine cyanurate particles have a size not exceeding 25μ and at least 95% by weight of the particles have a size not exceeding 5μ.

A flame retardant drawn yarn of at least 10μ in filament diameter can be prepared from the composition of this invention by melt spinning and subsequently drawing by using apparatus generally used for the melt spinning and drawing of nylon 6 or nylon 66.

The composition of this invention, in which nearly 100% of melamine cyanurate particles have a particle size of at most 35μ and at least 80% by weight of the particles have a size of at most 10μ, cannot be obtained on a commercial scale by the method used for preparing the conventional dispersion of melamine cyanurate in a polyamide, which comprises mixing together a fine powder of melamine cyanurate and a molten polyamide in the presence or absence of a dispersant by means of a mixing extruder. The composition of this invention is obtained only by the method of this invention described below in detail.

According to this invention, a melamine cyanurate-containing polyamide composition is obtained by allowing to react, at 200° to 300° C., a polyamideforming monomer, melamine and cyanuric acid in a molar ratio of the latter to the melamine of 0.95–1.05 in the presence of water in an amount necessary for effecting a neutralization reaction between the melamine and cyanuric acid. By such a process it is possible to control the particle size distribution of melamine cyanurate within a predetermined range. In this process, melamine and cyanuric acid react with each other without reacting with the end groups of the polyamide-forming monomer or the polyamide being formed, resulting in no marked decrease in the polymerization degree of polyamide. Thus, there is obtained a melamine cyanurate-containing polyamide composition in which melamine cyanurate is uniformly and finely dispersed in the resulting polyamide.

The reason why the fine and uniform dispersion of melamine cyanurate is formed in the process of this invention is not known. However, it is presumed that, contrary to the case where the additive remains solid throughout the polymerization (as in the case of polymerization of polyamide-forming monomer in the presence of titanium oxide), the added melamine and cyanuric acid, which dissolve successively in water, react with each other in an aqueous solution at a high temperature and as the polymerization and said reaction proceed simultaneously, the melamine cyanurate product deposits as fine crystals surrounded by the resulting polyamide or oligomer and the monomer which keep the fine crystals from secondary agglomeration, to result in a fine dispersion of minute particles of melamine cyanurate in the polyamide.

Figure 1:
FIG. 1 is an electron-microscopic photograph of finely powdered melamine cyanurate.

When examined under an electron microscope, the melamine cyanurate particles usually formed by reacting melamine with cyanuric acid in a medium of plain water appear flakelike or scalelike (FIG. 1), whereas the shape of melamine cyanurate particles in the composition of this invention appears different from the above-noted shape and most of the particles seem to be of prolonged shape, though not always distinct because observation was made through the polyamide matrix. The difference in the shape of particles seems to affect the characteristics of the dispersion or of the composition.

In the process of this invention, commercially available melamine and cyanuric acid in the form of powder or granules of any particle size may be used. In the conventional method in which melamine cyanurate is prepared separately and then mixed with a polymer, a great deal of labor and expense to is required obtain a finely and uniformly dispersed composition, whereas the process of this invention has an advantage of not requiring of such labor and expense.

The addition of melamine and cyanuric acid to the polymerization system can be carried out in known ways. Examples of such methods of addition include addition of powdered melamine and powdered cyanuric acid separately as such; addition of powdered melamine and powdered cyanuric acid separately in the form of slurries prepared by admixing with water; addition of a mixture of powdered melamine and powdered cyanuric acid; and addition of a mixture of powdered melamine and powdered cyanuric acid in the form of slurry in water. The addition of powdered materials is not recommendable from the commercial viewpoint because of the difficulties encountered in handling powders and the entrainment of air which deteriorates the polymer. It is preferable to add both materials in the form of a slurry-like fluid (or slurry-like fluids). The addition in the form of aqueous solution is not desirable, because of the very low solubilities in water of both materials (solubility of melamine: 2 g/100 g water at 80° C.; solubility of cyanuric acid: 3 g/100 g water at 80° C.) a large quantity of water is introduced in the polymerization system, resulting in marked retardation of polymerization. In bathwise operation, a reactor of a very large volume relative to the amount of formed polymer becomes necessary because of this large amount of water.

Figure 4:
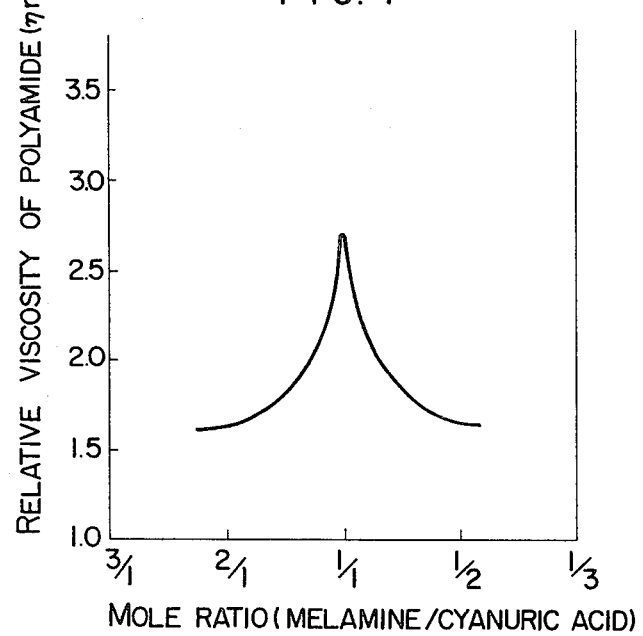
FIG. 4 is a diagram representing the change in relative viscosity of a polyamide with the change in molar ratio of melamine to cyanuric acid.

The molar ratio of cyanuric acid to melamine should be in the range of 0.95 to 1.05. If either of the reactants is used in excess beyond the above range, a decrease in the polymerization degree of polyamide will be caused by the excess melamine or cyanuric acid remaining in the reaction system after formation of melamine cyanurate by the equimolar reaction between melamine and cyanuric acid (FIG. 4). Moreover, the existence of excess melamine or cyanuric acid in the melamine cyanurate-containing polyamide composition will undesirably cause plate out and bubble formation during molding and blooming on the surface of the molded article.

The amount of melamine and cyanuric acid to be added to the polymerization system can be 2 to 25% by weight so that the composition of this invention may be directly formed after termination of the polymerization. Alternatively, at first a master batch of the composition rich in melamine cyanurate is prepared and then the master batch can be admixed with polyamide to obtain the composition of this invention containing prescribed amount of melamine cyanurate. In the latter case, the melamine cyanurate content of the master batch may exceed 25% by weight but should be below about 40% by weight, because otherwise the polymerization operation is interfered with because of: (a) the resulting decreased melt fluidity of the polymerization mixture; and (b) the resulting increased particle size of dispersed melamine cyanurate.

The addition of melamine and cyanuric acid to the polymerization during the progress of polymerization should be performed while a substantial portion of the polyamide-forming monomer remains unreacted or in the oligomer stage. In actual practice, both reactants can be added to the polyamide-forming monomer prior to the initiation of polymerization or, alternatively, either of the reactants is added to the monomer before the initiation of polymerization and the other reactant is added in the early stage of polymerization where a substantial portion of the monomer still remains unreacted or in the state of oligomer. If both or either of the reactants is added in the later stage of polymerization where a substantial portion of the monomer has been converted into high-molecular-weight polyamide, the formation of melamine cyanurate becomes incomplete.

The polyamide-forming monomers suitable for use are well-known lactams, polymerizable ω-amino acids, and combinations of diamines and dibasic acids. Examples are ε-caprolactam, aminocaproic acid, enantholactam, 7-aminoheptanoic acid, 11-aminoundecanoic acid, 9-aminononanoic acid, α-pyrrolidone, and α-piperidone; examples of diamines are hexamethylenediamine, nonamethylenediamine, undecamethylenediamine, dodecamethylenediamine, and m-xylylenediamine; and examples of dicarboxylic acids are terephthalic acid, isophthalic acid, adipic acid, sebacic acid, dodecanedioic acid, and glutaric acid.

For the progress of polymerization and reaction in the reactant mixture comprising a polyamide-forming monomer, melamine and cyanuric acid, the presence of water required for the neutralization reaction between melamine and cyanuric acid is necessary. In order that the formation of melamine cyanurate may proceed sufficiently, the presence of water in an amount of at least twice, preferably 4 times or more, the weight of the sum of melamine and cyanuric acid is desirable. In a known general procedure for producing nylon 6 from ε-caprolactam, the polymerization is allowed to proceed at 220° to 300° C. in the presence of catalytic amount, that is, 0.5% by weight (based on ε-caprolactam) of water for several to 20 hours, whereas in the process of this invention, in order to obtain a nylon 6 composition containing 4% by weight of melamine cyanurate, said amount of water is insufficient and the presence of 8% by weight (based on ε-caprolactam) or more of water is preferred. A method of effecting polymerization in the absence of water, such as polymerization of an anhydrous lactam with an alkali catalyst or thermal polymerization of 11-aminoundecanoic acid, is not applicable to the present case, because melamine cyanurate is not formed from the added melamine and cyanuric acid. On the other hand, the addition of water in large excess is undesirable, because it reduces the rate of polymerization and production efficiency on a commercial scale. The presence of water in an amount of 500 times or more the sum of weight of melamine and cyanuric acid, or 20 times or more the weight of polyamide-forming monomer should be avoided.

The polymerization temperature must be strictly controlled. Since melamine cyanurate begins to decompose at a temperature near about 300° C. under atmospheric pressure, the internal temperature of the polymerizer should be kept below 300° C., preferably 280° C., most preferably 270° C. In the commercial production of nylon 66 by thermal polymerization, the temperature of polymerization system in the final stage exceeds 280° C., whereas in the present case, it is preferable to keep the temperature below 270° C. However, since the melting point of nylon 66 is 265° C., it is very difficult to control the polymerization temperature within the range of 270° to 265° C. on a commercial scale. Such a difficulty can be avoided by adding a small amount of ε-caprolactam to the nylon 66-forming monomer to form a nylon 66/6 copolymer having a melting point lower than that of nylon 66 by several degrees.

It is desirable to provide the polymerizer with a mixing device such as stirrer in order to disperse the formed melamine cyanurate uniformly throughout the polyamide matrix.

Common additives such as pigments, fillers, viscosity controlling agents, reaction accelerators, heat stabilizers, antistatics, weathering stabilizers, etc., can be added to the polymerization system, if they do not affect adversely the progress of polymerization or formation of melamine cyanurate. As for heat stabilizers, those compounds or combinations of compounds (I, II and III) listed hereinbefore should be referred to.

The advantages of this invention, beside the improvement of flame retardancy, are as summarized below.

(1) The composition of this invention is not as cloudy as the conventional melamine cyanurate-containing composition but has translucency which approximates that of a plain polyamide.

(2) When injection molded, the conventional melamine cyanurate-containing polyamide composition exhibits a distinctive weld line which cannot be eliminated by changing the molding conditions such as molding temperature and injection pressure. Such line detracts much from the commercial value of molded articles. To the contrary, the melamine cyanurate-containing polyamide composition of this invention, on being injection molded, scarcely exhibits a weld line which would detract from commercial value of the molded articles.

(3) As compared with the conventional melamine cyanurate-containing polyamide composition, the composition of this invention has a much higher commercial value, because as a flame-retardant plastic molding material, the composition of this invention can be brightly colored with less pigment and has excellent molding properties without exhibiting a plate out or blooming phenomenon.

(4) As a material for synthetic fiber, the composition of this invention can be continuously and steadily melt spun and drawn to a drawn yarn of 10 to 100μ in filament diameter which has never been obtained from the conventional melamine cyanurate-containing polyamide composition.

(5) Because of its high flame retardancy and additional excellent characteristics inherent in polyamide fiber, the drawn yarn made from the composition of this invention can be woven to a fabric which is used without post treatment as a flame-retardant textile material.

(6) The process of this invention permits uniform and fine dispersion of melamine cyanurate in a polyamide and, in addition, is effective in rationalizing the manufacturing procedure. While the conventional process for producing a melamine cyanurate-containing polyamide composition involves three steps, that is, preparation of melamine cyanurate from melamine and cyanuric acid, polymerization of a polyamide-forming monomer to the polyamide, and melt-mixing of said melamine cyanurate and polyamide, the process of this invention is an epoch-making process in which the preparation of melamine cyanurate, the preparation of polyamide, and the mixing of said melamine cyanurate and polyamide are integrated into one step and, hence, is an economically favorable process when practiced on a commercial scale.

(7) Thus, even when a composition according to the present invention has components in the same ratio and the same particle diameter of melamine cyanurate as those of conventional composition, the two cannot be considered to be the same composition, because the present composition is different in fine structure from conventional composition and accordingly has a great advantage in the moldability and the property of molded article.

The invention is illustrated below in detail with reference to Examples. In Examples the testing and measurement were performed in the following way:

(1) Determination of the polymerization degree of polyamide: Determination was made from the measurement of relative viscosity, $\eta_r$, of a solution of polyamide, in accordance with the method of JIS K6810.

(2) Measurement of the particle size of dispersed particles in the composition and determination of the particle size distribution: A thin section, 7 to 8μ in thickness, was cut from the composition by means of a microtome and examined under an optical microscope (OPTIPHOT, type XUW-M, of Nippoin Kogaku Co.) with a lens of 100 magnifications. The image obtained was put into Particle Analyzer Luzex 450 (Toyo Ink Manufacturing Co.) and the particle size was measured and analyzed on the basis of maximum horizontal chord. The observation field was about 0.6 mm² each time. Ten observation fields were selected at random for each sample to determine the particle size distribution. The observed values of particle size were arranged in order of magnitude at 5μ intervals and the number of particles, $n_i$, in each fraction was counted. The weight of particles, $G_i$, in each fraction was calculated from the equation $G_i = \gamma_a \times n_i \times \pi di^3/6$, where di is median particle size in each fraction, $\gamma_a$ is specific gravity of the additive. For example, in a fraction having particle size of 10 to 15μ there are contained particles 10μ or more or less than 15μ in particle size. In this case, the di is calculated as follows: $di = (10+15)/2 = 12.5(\mu)$. The specific gravity of melamine cyanurate is 1.6. Then the total weight of particles of 5μ or more was calculated $(G = \Sigma G_i)$. The total weight of particles within the observed field was calculated by the equation $G_a =$ (area of observed field)×(thickness of the thin section)×(specific gravity of the composition)×(weight fraction of the additive). The total weight of particles less than 5μ, G′, was obtained by subtracting G from $G_a$. The particle size distribution on weight basis was obtained from G and G′.

(3) X-ray diffraction analysis: A plate specimen was molded from the sample and its X-ray diffraction pattern was obtained by means of an X-ray diffraction apparatus (Geigerflex, type DS, of Rigaku Denki Industry Co.); copper target, diffraction angle 5°–40°. The presence or absence of melamine cyanurate, melamine, and cyanuric acid was estimated from their characteristic peaks in the pattern.

(4) Flammability: Flammability test of the composition for use as a plastic molding material was performed on an injection-molded specimen, 1/16 inch in thickness, according to the method of vertical burning test specified in UL-94 of Underwriters' Laboratories, Inc., U.S.A. Flammability test of the composition for use in a textile material was conducted on a knitted specimen of the stocking shape prepared from the drawn yarn by means of a $3\frac{1}{2}''\phi$ circular knitting machine (type TC-H2 of Tsutsumi Seiki Co.). The test was performed in accordance with the D method (the 45° inclination coil method) of JIS L1091. Five test specimens were tested. The flammability was expressed in terms of average number of flame application and number of failure. (A specimen showing a number of flame application of 2 or less was valued as failure).

(5) Molding characteristics: Plate out was tested by the inspection of mold for plate out in injection-molding the flammability test specimen by means of an injection molding machine (type IS-90B of Toshiba Machine Co.). Blooming was tested on an injection-molded rectangular specimen, 6 in.×$\frac{1}{2}$ in.×$\frac{1}{8}$ in. The specimen was kept in a hot air oven at 150° C. for 10 days and inspected the surface of specimen for blooming.

(6) Coloring property: 97.5 Parts by weight of the composition under test and 2.5 parts by weight of nylon pellets of a black color master batch (Leona LCO20-M3300, Trade-mark for Asahi Chemical Industry Co.) were blended and injection-molded. The blackness of the molded piece was visually inspected. The molded piece was further tested for Hunter whiteness by means of a color difference meter.

(7) Mechanical properties: The tensile strength of the composition for use as a plastic material was tested on an injection-molded specimen, according to the method of ASTM D638. As for mechanical properties of the composition for use in textile material, the tensile strength and elongation were tested on a drawn yarn specimen, according to the testing method for filament yarn specified in JIS L1070.

(8) Heat resistance: The test specimens specified in ASTM D638 were molded from the polyamide composition and, after having been kept at 150° C. in a hot air oven, tested for the retention of tensile strength and discoloration due to thermal degradation.

EXAMPLE 1

(1) Preparation of an aqueous solution of a polyamide-forming monomer:

39.2 Kilograms of a 50% by weight aqueous solution of hexamethylenediammonium adipate (hereinafter referred to as 50% AH salt solution) and 1.9 kg of ε-caprolactam were mixed to prepare an aqueous monomer solution necessary for producing 18.8 kg of a nylon 66/6 copolymer containing 90% by weight of recurring units corresponding to nylon 66 and 10% by weight of recurring units corresponding to nylon 6 (this copolymer is herein referred to as Ny 66/6=90/10).

(2) Concentration of the aqueous polyamide-forming monomer solution:

The aqueous polyamide-forming monomer solution prepared in (1), which has a monomer concentration of 52% by weight, was heated to remove water by evaporation until the monomer concentration reached 70% by weight.

(3) Addition of the aqueous polyamide-forming monomer solution, melamine and cyanuric acid to a polymerizer:

To an 80-liter pressure autoclave provided with a heating jacket containing a heat transfer medium of Dowtherm A (Trademark for Dow Chemical Co.), stirrer, pressure gage, thermometer, and pressure regulating valve, were added 30.7 kg of the concentrated aqueous polyamide-forming monomer solution, then a slurry containing 592 g (4.7 moles) of powdered melamine and 1.5 kg of water, and finally a slurry containing 606 g (4.7 moles) of cyanuric acid and 1.5 kg of water.

Figure 5:
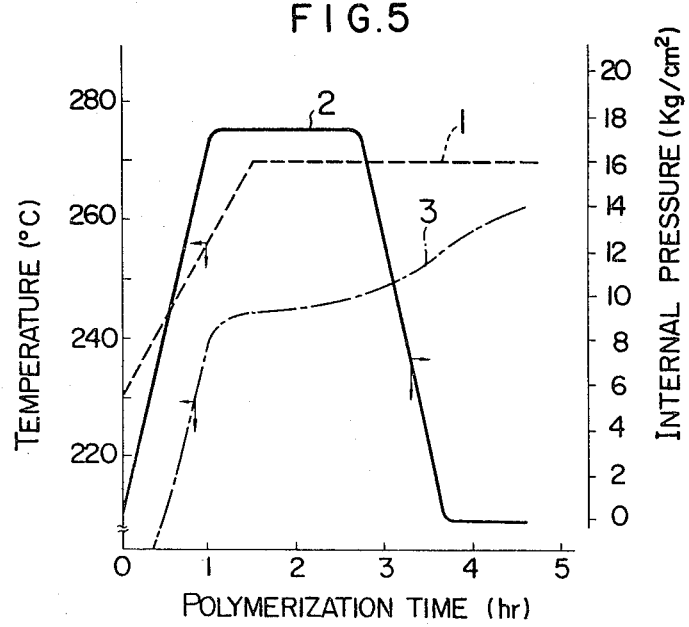
FIG. 5 is diagrams representing the changes in polymerization conditions with time in preparing the polyamide composition of this invention.

(4) Formation of polyamide:

After having been charged with the aqueous polyamide-forming monomer solution, melamine and cyanuric acid, the 80-liter autoclave was immediately closed tightly and polymerization was started at a jacket temperature of 230° C. During the progress of polymerization, the jacket temperature and the internal pressure of autoclave were controlled as shown in FIG. 5 in which is also shown the change in internal temperature of the autoclave. In FIG. 5, curve 1 represents the jacket temperature, curve 2 the internal pressure of the autoclave and curve 3 the internal temperature of the autoclave. On termination of the polymerization after about 4 hours and 40 minutes, a valve at the bottom of the autoclave was opened to extrude, under an applied nitrogen gas pressure, the molten polyamide composition in the form of strand through a die having 4 orifices, 5 mm in diameter, provided in front of the bottom valve. The extruded strand was cooled in water and cut by means of a cutter to cylindrical pellets, 3 mm $\phi \times 3$ mm length, to obtain a polyamide composition.

Figure 3:
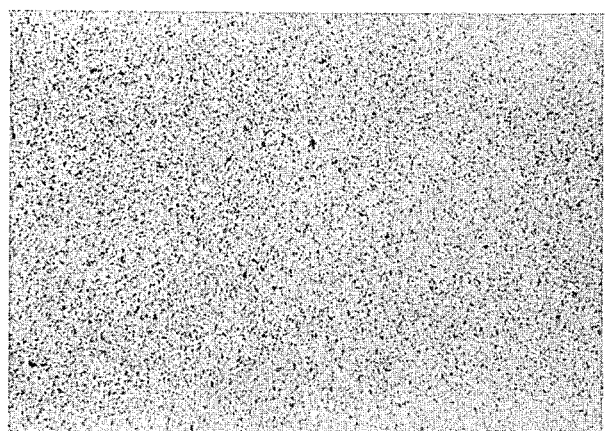
FIG. 3 is a photomicrograph of a melamine cyanurate-containing polyamide composition of this invention.
Figure 6:
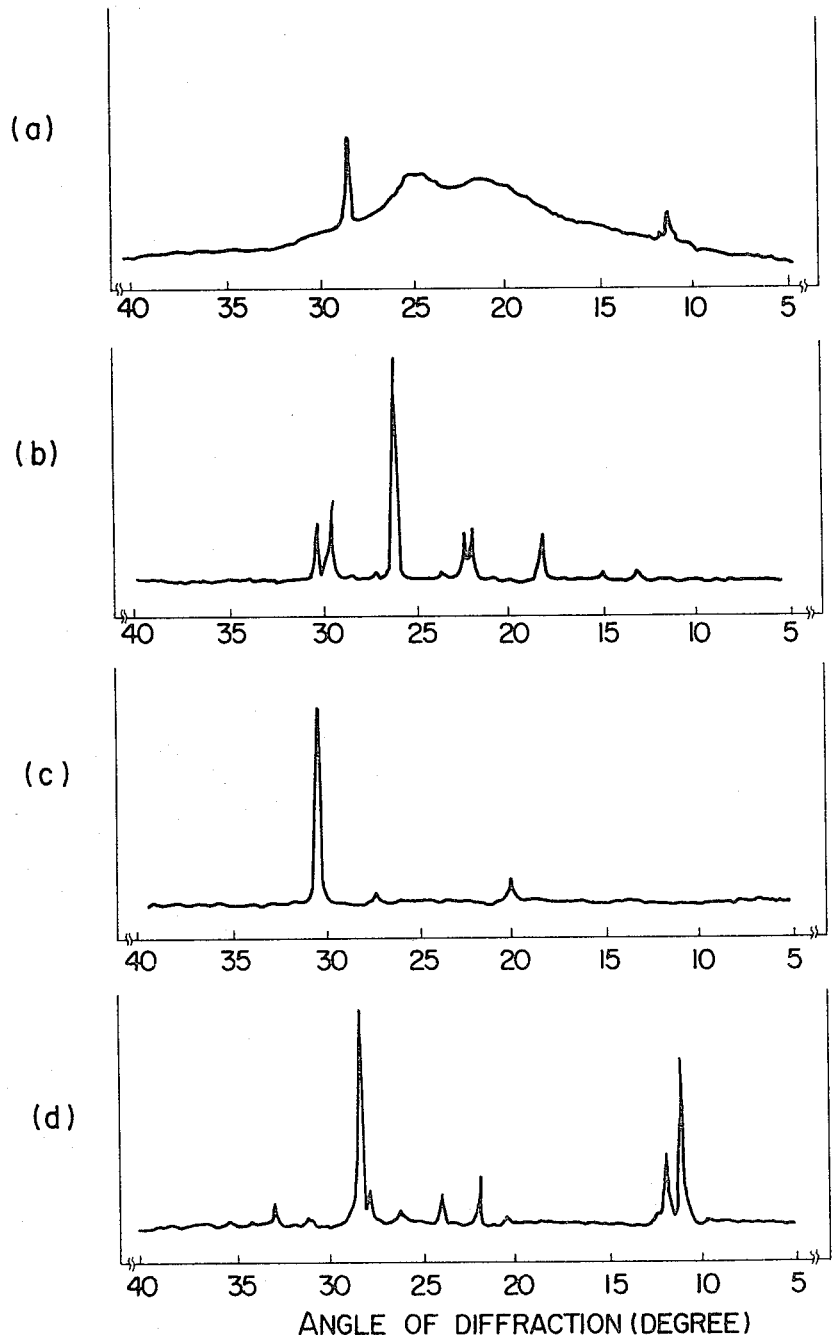

(5) Test and evaluation of the polyamide composition:

The polyamide composition obtained in (4) was examined for polymerization degree, X-ray diffraction pattern, and particle size distribution. The relative viscosity $\eta_r$ was 2.6, indicating sufficient progress of polymerization. The X-ray diffraction pattern was as shown in FIG. 6(a). In FIG. 6 are also shown, for comparison, X-ray diffraction patterns (b) to (d) of powdered melamine, powdered cyanuric acid and powdered melamine cyanurate. From FIG. 6(a) to (d), it is seen by comparison that melamine and cyanuric acid were not detected but only melamine cyanurate was present in the polyamide composition. FIG. 3 shows the photomicrograph of the composition. The particle size distribution on weight basis was as shown in FIG. 9 (curve 1). As is apparent from these figures, melamine cyanurate was very uniformly and finely dispersed and 100% of the dispersed particles showed a size of at most 25μ, 99% by weight of particles showed a size of at most 20μ, and 96% by weight of particles showed a size of at most 5μ. The performance characteristics of the composition as a plastic molding material were evaluated with respect to UL94 flammability, mechanical properties, coloring property, and molding characteristics. The results obtained were as shown in Table 1 which indicates that the composition of this invention is excellent with respect to all test items.

EXAMPLE 2

(Comparative Example)

(1) Formation of polyamide:

Using the same polymerizer as used in Example 1 and under the conditions similar to those of Example 1, a nylon 66/6 copolymer (Ny 66/6=90/10) was prepared without the addition of melamine and cyanuric acid. Polymerization was controlled so that the polymerization degree in terms of relative viscosity $\eta_r$ may become 2.6.

(2) Preparation of melamine cyanurate:

An aqueous melamine solution prepared by heating at 85° C. 100 liters of water and 2.52 kg (20 moles) of melamine and an aqueous cyanuric acid solution prepared by heating at 85° C. 100 liters of water and 2.58 kg of cyanuric acid were mixed. Melamine cyanurate precipitated by the neutralization reaction was collected by filtration, dried and finely ground by means of a fine grinding machine to obtain finely powdered melamine cyanurate.

(3) Incorporation of melamine cyanurate into the polyamide:

9.4 Kilograms of the polyamide (Ny 66/6=90/10) prepared in (1) and 600 g of finely powdered melamine cyanurate prepared in (2) were preliminarily blended, fed to a 30-mm $\phi$ co-rotating twin-screw extruder provided with kneading discs (a mixing extruder, type PCM-30, of Ikegai Iron Works) and extruded at 265° C. into extrudate in the form of strand. The extrudate was cooled in water and cut by means of a cutter to cylindrical pellets, 3 mm $\phi \times 3$ mm length, of melamine cyanurate-containing polyamide composition.

Figure 2:
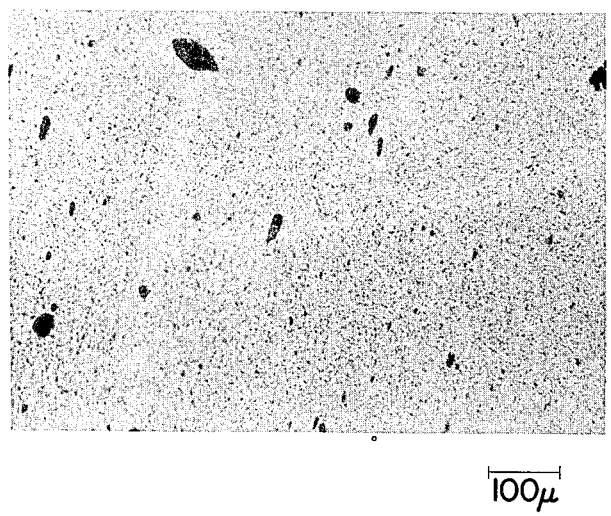
FIG. 2 is a photomicrograph of a conventional melamine cyanurate-containing polyamide composition.

(4) Test of the composition:

The composition obtained in (3) was examined for X-ray diffraction pattern in the same manner as in Example 1. The pattern obtained was as shown in FIG. 7. It is natural that diffraction peaks characteristic of melamine cyanurate alone were present. By comparison of FIG. 7 with FIG. 6(a), it is seen that the densities of both peaks characteristic of melamine cyanurate were nearly the same, indicating that the melamine cyanurate contents of both compositions are substantially the same. The photomicrograph and the particle size distribution of the composition obtained in the present Example 2 were as shown in FIG. 2 and FIG. 9 (curve 2), respectively. The electron-microscopic photograph of the powdered melamine cyanurate prepared in (2) was shown in FIG. 1. This melamine cyanurate sample was subjected to wet sieve analysis using a 5μ micromesh sieve. Since the fraction remained on the sieve was only a trace amount, it was found that the particles of this melamine cyanurate were very fine. Therefore, it is apparent that even if finely powdered melamine cyanurate was used, there were scattered in the composition large particles of several tens microns formed by secondary agglomeration. The results of evaluation of the composition as a plastic molding material were as shown in Table 1, the evaluation methods being the same as in Example 1. It is seen that the coloring property is inferior to the composition obtained in Example 1.

EXAMPLE 3

(Comparative Example)

700 Grams of melamine cyanurate prepared in Example 2 and 300 g of ethylenebisstearamide, used as dispersant, were thoroughly mixed together in a Henschel mixer. 900 Grams of the resulting mixture and 9.1 kg of the polyamide prepared in Example 2 were preliminarily blended. The blend was fed to a 40-mm $\phi$ single screw extruder provided with a Dulmage-type mixing section (made by Tanabe Plastics Machine Co.), melt-mixed at 265° C., and extruded to obtain a composition in pellet form. The particle size distribution of melamine cyanurate in the composition and the results of evaluation as a plastic molding material were as shown in Table 1.

EXAMPLE 4

(Comparative Example)

In the same manner as in Example 3, pellets of a melamine cyanurate-containing polyamide composition were prepared, except that a 50-mm $\phi$ co-rotating twin-screw extruder provided with kneading discs (type TEM-50 of Toshiba Machine Co.) was used in place of the extruder used in Example 3. The particle size distribution of melamine cyanurate in the composition and the results of evaluation of the composition as a plastic molding material were as shown in Table 1. The dispersibility of melamine cyanurate was not much improved by the presence of a dispersant.

EXAMPLE 5

In a manner similar to that in Example 1, an aqueous polyamide-forming monomer solution required for producing 14.0 kg of a nylon 66/6 copolymer (Ny 66/6=75/25) was prepared from a 50% AH salt solution and ε-caprolactam. After having been concentrated to a monomer concentration of 65% by weight, said aqueous monomer solution was introduced into the same polymerizer as used in Example 1. Similarly to Example 1, a slurry of 2.96 kg of melamine and 3.0 kg of water was added to the polymerizer, followed by a slurry of 3.04 kg of cyanuric acid and 3.0 kg of water. Polymerization was carried out in the same manner as in Example 1, except that the final temperature in the polymerizer was controlled at 250° C. The resulting composition containing 30% by weight of melamine cyanurate was examined by X-ray diffraction analysis and particle size distribution analysis and further evaluated as a plastic molding material. The X-ray diffraction pattern showed the presence of melamine cyanurate and absence of both melamine and cyanuric acid. The particle size distribution and the results of evaluation as a plastic molding material were as shown in Table 1. Dispersion of melamine cyanurate was favorable but the coloring property became inferior.

EXAMPLE 6

Pellets of polyamide composition obtained in Example 5 and pellets of nylon 66/6 copolymer (Ny 66/6=90/10) obtained in Example 2(1) were preliminarily blended in weight ratios of 1:2, 1:4 and 1:19. Each blend was injection molded and each molded piece was subjected to the determination of particle size distribution and flame retardancy and the coloring test.

94% by weight of the particles were at most 5μ, indicating good dispersibility.

TABLE 2

| Composition of molded piece | | Particle size distribution | | | | Flame retardancy | Coloring test |
|---|---|---|---|---|---|---|---|
| Weight ratio of pellets of composition of Example 5 to pellets of polyamide of Example 2 | Melamine cyanurate content (wt.-%) | Particle size (μ) | Weight % | Particle size (μ) | Weight % | UL-94 flammability | Visual inspection (Hunter whiteness) |
| 1:2 | 10 | ≦25 | 100 | ≦5 | 95 | V-0 | Black (3.1) |
| 1:4 | 6 | ≦25 | 100 | ≦5 | 94 | V-0 | Black (2.0) |
| 1:19 | 1.5 | ≦25 | 100 | ≦5 | 95 | V-2 | Black (1.9) |

TABLE 1

| Example No. | Particle size distribution | | | | Flame retardancy UL-94 Flammability | Mechanical property Tensile strength (kg/cm²) | Coloring test Visual inspection (Hunter whiteness) | Molding characteristics | |
|---|---|---|---|---|---|---|---|---|---|
| | Particle size (μ) | Weight % | Particle size (μ) | Weight % | | | | Plate out | Blooming |
| 1 | ≦25 | 100 | ≦5 | 96 | V-0 | 860 | Sufficiently black (2.1) | No | No |
| 2 | ≧60 | 5 | ≧40 | 20 | V-0 | 830 | Grey (6.1) | No | No |
| 3 | ≧70 | 10 | ≧35 | 30 | V-2 | 800 | Grey; white particles visible (6.4) | No | No |
| 4 | ≧50 | 5 | ≧30 | 20 | — | — | Grey (6.1) | No | No |
| 5 | ≦25 | 100 | ≦5 | 95 | V-0 | 740 | Grey (6.2) | No | No |

The results obtained were as shown in Table 2. Substantially no increase of secondary agglomeration was observed when the composition of Example 5, which contained melamine cyanurate in a high concentration, and a polyamide were melt-mixed. The flame retardancy was found insufficient when the melamine cyanurate content of the molded article was 1.5% by weight.

EXAMPLE 7

9.45 Kilograms of the Ny 66/6 copolymer prepared in Example 2(1), 500 g of powdered potassium iodide, and 50 g of cupric acetate were preliminarily blended. The blend was fed to the same extruder as used in Example 2, melt-mixed at 265° C. and extruded to prepare pellets of a polyamide composition rich in heat stabilizer. These pellets and the pellets of melamine cyanurate-containing composition obtained in Example 1 were preliminarily blended in a weight ratio of 1:19. The resulting blend was melt-mixed and molded by means of an injection molding machine. The results of heat resistance test performed on the molded article was as shown in Table 3. The particle size distribution in the molded article was determined and found that nearly 100% of the dispersed particles where at most 25μ and coloring property. It was sufficiently black and the Hunter whiteness was 2.2.

EXAMPLES 8 TO 10

In a manner similar to that in Example 7, pellets of heat stabilizer rich compositions of the composition shown in Table 4 were prepared. By using an injecting molding machine the pellets obtained above and the pellets of the melamine cyanurate-containing polyamide composition of Example 1 were mixed in a weight ratio of 1:19 and molded. The results of heat resistance test performed on the molded pieces were as shown in Table 3.

EXAMPLE 11

For comparison, the heat resistance of the melamine cyanurate-containing composition of Example 1 was tested without the addition of a heat stabilizer. The result obtained was as shown in Table 3.

Flame retardancy was found also excellent (V-0). The above pellets of heat stabilizer-containing composition, a black pigment master batch in pellet form for use in coloring test, and the melamine cyanurate-containing composition in pellet form of Example 1 were blended in a weight ratio of 1:1:19 and injection-molded. The resulting colored molded piece was examined for the

TABLE 3

| Example No | Retention of tensile strength (%) | | | Color of molded piece after 500 hours |
|---|---|---|---|---|
| | 100 hrs | 300 hrs | 500 hrs | |
| 7 | 99 | 96 | 94 | Light brown |
| 8 | 90 | 81 | 70 | Light brown |

TABLE 3-continued

| Example No | Retention of tensile strength (%) | | | Color of molded piece after 500 hours |
|---|---|---|---|---|
| | 100 hrs | 300 hrs | 500 hrs | |
| 9 | 98 | 97 | 85 | Light brown |
| 10 | 99 | 98 | 95 | Light brown |
| 11 | 50 | 25 | 15 | Dark brown |

TABLE 4

| Example No. | Copper compound | Alkali metal halide | Tin compound |
|---|---|---|---|
| 8 | Cuprous chloride (0.57) | — | — |
| 9 | Cuprous chloride (0.19) | Potassium iodide (1.9) | — |
| 10 | Cuprous chloride (0.95) | Potassium iodide (7.6) | Stannous chloride (0.10) |

Note:
The figures in parentheses are the amounts added in weight-% based on the composition containing heat stabilizer in a high concentration.

EXAMPLE 12

The compositions of Examples 1 and 2 were tested for the weld-line on their molded products. For this purpose, pellets of each composition were injection-molded at 250° C. to form a rectangular molded piece, 5 inches long, 0.5 inch wide and 0.03 inch thick, by using a mold provided with a gate at each end in the longitudinal direction. The molten resin enters the mold cavity from both gates and flows to join each other leaving a mark on the molded piece. This mark or weld-line is distinctly visible on the molded piece from the composition of Example 2, whereas it is scarcely perceptible in the case of the composition of Example 1.

EXAMPLE 13

The pellets of melamine cyanurate-containing polyamide composition obtained in Example 1 were spun at 265° C. by means of a 45-mm φ extrusion spinning machine through a spinneret having 24 holes of 0.2 mm diameter, at a take-up speed of 1,030 m/minute. An increase of filtration pressure at the spinneret was scarcely observed. The undrawn yarn was drawn under the conditions: drawing speed, 900 m/minute; draw ratio: 3.0; and then drawn yarn, 70 d/24 fill was obtained. Continuous operation was possible, because the yarn breaking during spinning and drawing was rare. The results of tests for mechanical properties and flame retardancy were as shown in Table 5. The composition of this invention could be spun and drawn accompanying scarce yarn breaking and gave polyamide fiber having desirable mechanical properties and flame retardancy.

EXAMPLE 14

In a manner similar to that in Example 13, the polyamide composition obtained in Example 2 was spun and drawn. In this case, yarn breaking during the spinning and drawing was so frequent and the increase of filtration pressure at the spinneret during spinning was so large that it was impossible to obtain satisfactory yarn for the evaluation purpose.

EXAMPLE 15

The pellets of the composition containing melamine cyanurate in a high concentration obtained in Example 5 and nylon 6 pellets were blended in a weight ratio of 1:3. The blend was spun and drawn in a manner similar to that in Example 13. The spinning and drawing could be carried out as smoothly as in Example 13. The results of evaluation of the yarn obtained were as shown in Table 5.

EXAMPLE 16

For comparison, nylon 6 pellets alone were spun and drawn in a manner similar to that in Example 13. The draw ratio was 3.2. The results of evaluation of the resulting yarn were as shown in Table 5.

EXAMPLES 17 TO 20

Mixtures of melamine and cyanuric acid in molar ratios of 2.0:1.0 (Example 17), 1.5:1.0 (Example 18), 1.2:1.0 (Example 19), and 1.0:1.3 (Example 20) were prepared. Each mixture was added to an aqueous monomer solution for forming a polyamide Ny 66/6=90/10 so that the weight of melamine-cyanuric acid mixture may become 6% by weight based on the polyamide composition to be formed. Polymerization of the resulting mixture was carried out in a manner similar to that in Example 1. As shown in Table 6, if the melamine-cyanuric acid mixture is not an equimolar one, the formed polyamide could not reach a polymerization degree suitable for practical use of the composition. The composition of Example 17 was evaluated as a plastic molding material.

TABLE 5

| Example No. | Flame retardancy (n = 5) | | Tensile strength (g/d) | Elongation (%) |
|---|---|---|---|---|
| | Average number of flame application | Number of failure | | |
| 13 | 4.2 | 0 | 4.7 | 30 |
| 15 | 4.6 | 0 | 4.5 | 29 |
| 16 | 1.6 | 5 | 4.9 | 35 |

TABLE 6

| Example No. | Molar ratio of melamine to cyanuric acid | Relative viscosity $\eta_r$ |
|---|---|---|
| 17 | 2.0:1.0 | 1.7 |
| 18 | 1.5:1.0 | 1.9 |
| 19 | 1.2:1.0 | 2.0 |
| 20 | 1.0:1.3 | 1.9 |

As seen from Table 7, this composition was inferior in mechanical properties and coloring property and, in addition, showed undesirable plate out and blooming.

EXAMPLE 21

A polyamide composition was prepared in the same manner as in Example 2, except that an equimolar mixture of melamine and cyanuric acid was used in place of the melamine cyanurate. As shown in FIG. 8, the X-ray diffraction pattern of the composition showed no peak characteristic of melamine cyanurate but peaks characteristic of melamine and cyanuric acid, indicating that melamine and cyanuric acid did not react when mixed with the molten polyamide in the extruder. The composition was evaluated as a plastic molding material and the results were as shown in Table 7. It is seen that the coloring property and the molding characteristics are inferior.

TABLE 7

| Example No. | Flame retardancy UL-94 Flammability | Mechanical property Tensile strength (kg/cm²) | Coloring test Visual inspection (Hunter whiteness) | Molding characteristics Plate out | Blooming |
|---|---|---|---|---|---|
| 17 | — | 710 | Grey (6.0) | Yes | Yes |
| 21 | — | 800 | Grey; white particles visible (6.3) | Yes | Yes |
| 26 | V-0 | 850 | Sufficiently black (2.1) | No | No |

EXAMPLE 22

A polyamide composition was prepared in the same manner as in Example 1, except that both melamine and cyanuric acid were added after 3 hours and 50 minutes from the beginning of polymierization when the internal pressure had decreased to atmospheric pressure. On X-ray diffraction analysis, it was found that melamine and cyanuric acid remained unreacted.

EXAMPLES 23 TO 25

Into a 200-ml autoclave provided with a pressure gage, pressure regulating valve and stirrer, were introduced each of the monomers, shown in Table 8, in an amount necessary to form 47.5 g of polyamide, and then 2.5 g of an equimolar mixture of powdered melamine and powdered cyanuric acid. Polymerization was carried out under normal conditions for each monomer to obtain 50 g of respective polyamide composition. The resulting composition was examined by X-ray diffraction analysis for the presence or absence of melamine cyanurate. The particle size distribution in each composition was also determined. The polymerization conditions and test results were as shown in Table 8. In Example 23, the starting mixture comprising an aqueous nylon 66-forming monomer solution and equimolar amounts of melamine and cyanuric acid was analyzed at the beginning of polymerization to find whether melamine cyanurate has been formed or not. It was confirmed that almost all melamine and cyanuric acid remain unreacted.

EXAMPLE 26

A polyamide composition was prepared in the same manner as in Example 1, except that the polymerization was carried out without stirring. The resulting composition showed a polymerization degree of 2.5 in terms of relative viscosity $\eta_r$. From the X-ray diffraction pattern, the presence of melamine cyanurate in a sufficient amount was confirmed. On particle size distribution analysis, it was found that 100% of the melamine cyanurate particles had a particle size of at most 25μ and 94% by weight of the particles had a size of at most 5μ, indicating that the difference in particle size distribution from that of Example 1 was small. The results of evaluation as a plastic molding material were as shown in Table 7.

TABLE 8

| Example No. | Polyamide Type | Monomer (Amount in g) | Amount added of melamine-cyanuric acid equimolar mixture (g) | Polymerization condition | Final temperature in polymerizer (°C.) | Presence of melamine cyanurate | Particle size distribution Particle size (μ) | Percent by weight |
|---|---|---|---|---|---|---|---|---|
| 23 | Ny66 | 50% aqueous AH salt solution (110) | 2.5 | Temperature: increased from 230° to 275° C. Pressure: superatmospheric in earlier stage; decreased to atmospheric in later stage. | 273 | Yes | ≦35 ≦5 | 100 85 |
| 24 | Ny610 | 50% aqueous SH salt*¹ solution (107) | 2.5 | Temperature: increased from 230° to 270° C. Pressure: superatmospheric in earlier stage; decreased to atmospheric in later stage. | 265 | Yes | ≦30 ≦10 | 100 80 |
| 25 | Ny11 | 11-Aminoundecanoic acid*² (54) | 2.5 | 220° C. Atmospheric pressure (nitrogen atmosphere) | 215 | No | — | — |

Note:
*¹Salt of sebacic acid with hexamethylenediamine.
*²Without the addition of water.

What is claimed is:

1. A flame-retardant polyamide composition which comprises 98 to 75% by weight of a polyamide and 2 to 25% by weight of melamine cyanurate prepared by a process comprising admixing with a polyamide-forming monomer substantially equimolar quantities of melamine and cyanuric acid and water in an amount sufficient to cause a neutralization reaction between melamine and cyanuric acid and heating the resulting mixture to cause the monomer to polymerize and the melamine and cyanuric acid to react; said process resulting in a product composition consisting essentially of a polyamide matrix containing melamine cyanurate particles in a state of uniform dispersion within the matrix.

2. A composition according to claim 1 wherein the composition is prepared according to a process in which the melamine and cyanuric acid are admixed with the monomer prior to the initiation of polymerization.

3. A composition according to claim 1 wherein the composition is prepared according to a process in which at least one of the reactants, melamine and cyanuric acid, is admixed with the polyamide-forming monomer after the initiation of polymerization but before a substantial portion of the monomer has been converted to high molecular weight polymer.

4. The flame-retardant polyamide composition of claim 1 in which the polyamide is at least one member selected from the group consisting of nylon 6, nylon 66 and nylon 66/6 copolymers.

5. The flame-retardant composition according to claim 4 in which the polyamide is nylon 66/6 copolymer containing 90 to 75% by weight of recurring units corresponding to nylon 66 and 10 to 25% by weight of recurring units corresponding to nylon 6.

6. The flame-retardant composition according to claim 1 in which the polyamide-forming monomer is at least one member selected from the group consisting of ε-caprolactam and hexamethylene-diammonium adipate.

7. The flame-retardant composition of claim 1 in which the molar ratio of cyanuric acid to melamine is 0.95 to 1.05.

8. The flame-retardant polyamide composition of claim 1 in which the monomer is polymerized at 220° to 280° C.

* * * * *